Feb. 2, 1926.  1,571,724
C. L. HUBBS
SAFETY LOCK FOR MOTOR VEHICLES
Filed March 23, 1925    2 Sheets-Sheet 1
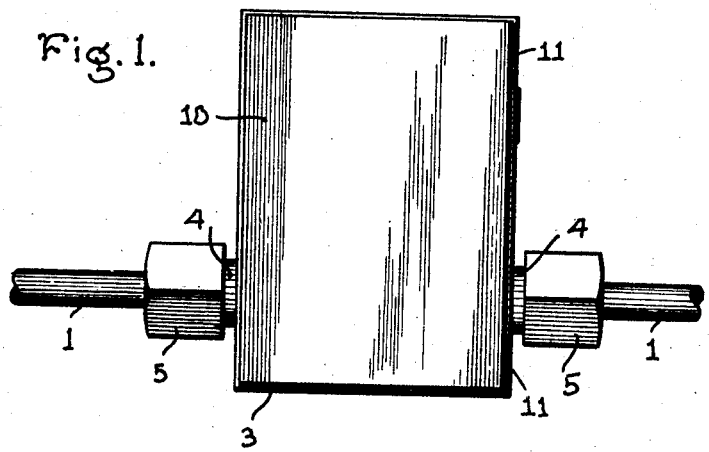
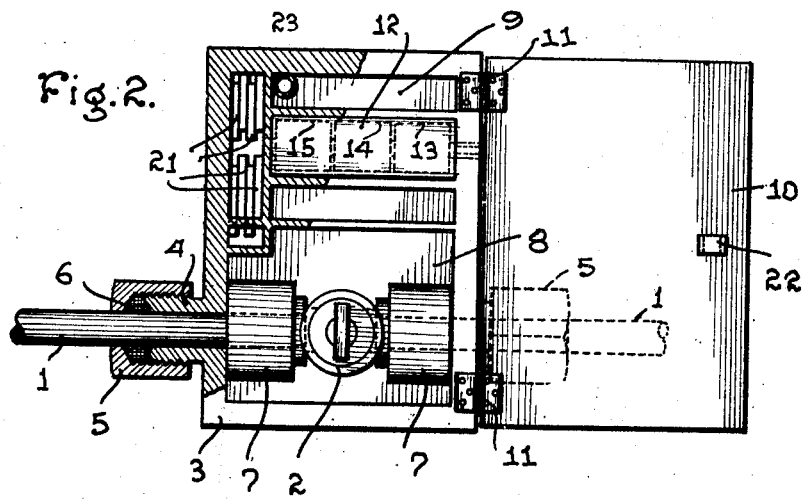
Inventor
C. L. Hubbs
By
Attorney Feb. 2, 1926.  
C. L. HUBBS  
1,571,724  
SAFETY LOCK FOR MOTOR VEHICLES  
Filed March 23, 1925    2 Sheets-Sheet 2
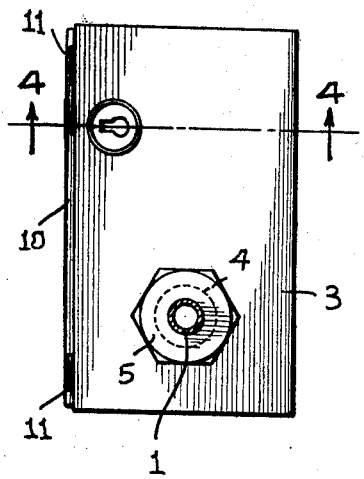
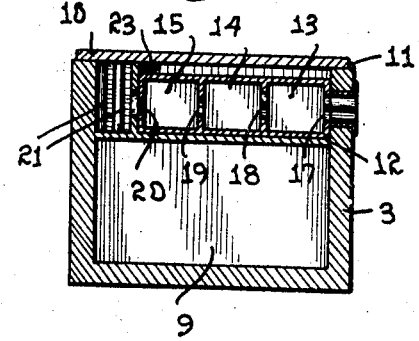
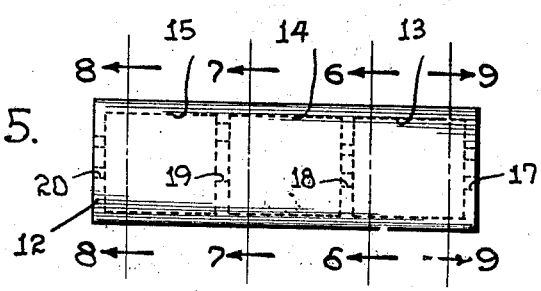
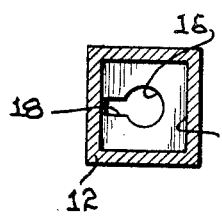 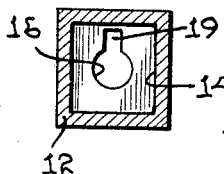 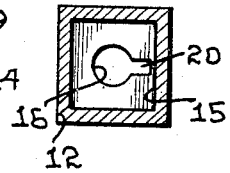 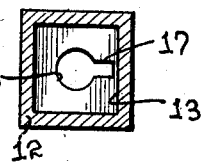
Inventor  
C. L. HUBBS  
By  
Attorney Patented Feb. 2, 1926.

1,571,724

UNITED STATES PATENT OFFICE.

CHARLES L. HUBBS, OF SAN DIEGO, CALIFORNIA.

SAFETY LOCK FOR MOTOR VEHICLES.

Application filed March 23, 1925. Serial No. 17,732.

*To all whom it may concern:*

Be it known that CHARLES L. HUBBS, a citizen of the United States of America, residing at San Diego, in the county of San Diego and State of California, has invented new and useful Improvements in Safety Locks for Motor Vehicles, of which the following is a specification.

It is a purpose of this invention, in its broadest aspect, to provide means to prevent the theft of an automobile by an unauthorized person, and to accomplish this result it is another purpose to provide a housing for enclosing the stop cock in the gas line at a point between the source of gasoline supply and the carburetor.

A further purpose is the provision of a lock for retaining the closure of the housing in a locked position to prevent access to the stop cock of the gas line, said stop cock having been closed prior to securing the closure in a locked position.

A still further purpose is to provide a lock including a plurality of slides independently movable and interchangeable, making many combinations possible, so that the owner of the automobile may change the combination in case the owner has reached the conclusion that the combination previously used has been discerned by others, thereby warding off any possible theft of the automobile.

Furthermore, the invention has for its purpose the provision of a safety device of this character which is simple and economical in construction and has strength and durability and includes means to render the picking of the lock impossible. Moreover, the lock and the housing, in so far as its application to the gas line and the controlling stop cock is concerned, are simple and inexpensive.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a view showing a portion of the gas line between the source of gasoline supply and the carburetor, illustrating the improved anti-theft device as applied.

Figure 2 is a view showing the closure of the housing open, with a part of the housing in section, more clearly illustrating the passage for the key and also the interchangeable slides which may cooperate with a catch or clasp on the closure to retain the latter locked.

Figure 3 is an elevational view of the structure of Figure 1, looking at the right hand side of the latter.

Figure 4 is a transverse horizontal sectional view on the plane indicated by the line 4—4 of Figure 3.

Figure 5 is a detail elevational view illustrating the compartmental frame or inner casing.

Figures 6, 7, 8 and 9 are vertical sectional views respectively on the planes indicated by the lines 6—6, 7—7, 8—8 and 9—9 of Figure 5.

Referring to the drawings, 1 designates a suitable gas line which may extend from the source of gasoline supply to the carburetor and which is provided with a stop cock 2 for controlling the supply, and mounted upon the gas line is a casing 3 which may be any suitable shape, preferably as shown. This casing has extension tubes 4 projecting from opposite walls of the casing, and through which the gas line passes, there being lock nuts 5 for fastening and holding the casing 3 in position. These lock nuts, which thread upon the extensions 4, have packing glands 6 to insure against any possible adjustment of the casing.

Certain opposite faces of the wall of the housing having inner extensions 7 also house the gas line and terminate in positions upon opposite sides of the stop cock to prevent free movement of the casing relative to the stop cock. In fact, when the casing is adjusted one way or the other, it is in applied position on the gas line.

The casing or housing has two compartments 8 and 9, the latter housing the stop cock and a portion of the gas line and also the inner extensions of the casing, there being a closure or door 10 hinged at 11 for closing one face or side of the casing, that is, closing both the compartments and more especially closing the compartment containing the stop cock, which will prevent unauthorized persons from gaining access to the stop cock for the purpose of turning on the gas.

Mounted in the compartment 9 is a compartmental frame or inner casing 12 provided with a plurality of compartments 13, 14 and 15 and a passage 16 for the reception of a key (not shown). The end walls of the complemental frame or inner casing as well as the partitions sub-dividing the compartments 13, 14 and 15 have slots 17, 18, 19 and 20 which radiate in different positions from the key-receiving passage of the inner casing, enabling the key to be given a quarter turn, before the tongue of the key can pass through any one of the partitions or the end walls.

However, after the key has been inserted so that the tongue of the key may reach a position beyond the third compartment, the tongue will be in a position to cooperate with any one of the slides 21, so that certain of the slides may be actuated for disengaging them from a catch or clasp 22 which is carried by the closure, thereby permitting the closure to open. The catch or clasp enters a recess or pocket of the casing, so that the slides may cooperate with the catch or clasp, so as to retain the closure in a locked position. Suitably arranged in the casing is a coil spring 23 which acts to move the closure or door to a slightly open position when the slides have been actuated to release the catch or clasp, so that the door or closure may be further opened by hand, and when opened, the owner is permitted to have access to the compartment 9 where the stop cock can be operated to open position to permit the flow of gasoline to the carburetor.

The invention having been described, what is claimed is:

1. The combination with a gas line between a source of supply and a carburetor, said gas line including a stop cock, of a casing mounted on the gas line and housing and stop cock and having a closure and a compartment, the closure having a catch, the casing having a keeper for the reception of the catch, and means mounted in said compartment consisting of a plurality of slides for cooperating with the catch for holding the catch in the keeper.

2. The combination with a gas line between a source of supply and a carburetor, said gas line including a stop cock, of a casing mounted on the gas line and housing the stop cock and having a closure and a compartment, the closure having a catch, the casing having a keeper for the reception of the catch, means mounted in said compartment consisting of a plurality of slides for cooperating with the catch for holding the catch in the keeper, and a key-receiving passage having angularly offset steps constructed in the compartment for the reception of a key for actuating the slides for releasing the catch.

3. The combination with a gas line from a source of supply to a carburetor, said gas line having a stop cock, of a casing on the gas line provided with a pair of compartments, one housing the stop cock, an auxiliary casing mounted in the other compartment, the auxiliary casing having a key-receiving passage having angularly offset steps, the main casing having a keeper, a closure for the main casing and having a catch engaging said keeper, and a plurality of slides mounted in the auxiliary casing at the end of said key-receiving passage for cooperating with the catch for holding the closure locked, whereby, upon entering the key in said passage, the slides may be actuated to release the catch.

4. The combination with a gas line from a source of supply to a carburetor, said gas line having a stop cock, of a casing on the gas line provided with a pair of compartments, one housing the stop cock, an auxiliary casing mounted in the other compartment, the auxiliary casing having a key-receiving passage having angularly offset steps, the main casing having a keeper, a closure for the main casing and having a catch engaging said keeper, and a plurality of slides mounted in the auxiliary casing at the end of said key-receiving passage for cooperating with the catch for holding the closure locked, whereby, upon entering the key in said passage, the slides may be actuated to release the catch, the auxiliary casing being compartmental with partitions intervening the compartments thereof, the passage consisting of a key-receiving tube slotted and adjoining the slots in the partitions between the compartments in the auxiliary casing, the slots in the partitions radiating from the tube in different directions requiring a plurality of quarter turns to permit the key to enter the passage.

In testimony whereof he affixes his signature.

CHARLES L. HUBBS.